United States Patent
Nakao

(10) Patent No.: US 8,917,059 B2
(45) Date of Patent: Dec. 23, 2014

(54) INTER-MODULE VOLTAGE BALANCE CORRECTING CIRCUIT OF A POWER STORAGE SYSTEM

(75) Inventor: Fumiaki Nakao, Shizuoka (JP)

(73) Assignee: FDK Corporation, Tokyo (JP)

( * ) Notice: Subject to any disclaimer, the term of this patent is extended or adjusted under 35 U.S.C. 154(b) by 913 days.

(21) Appl. No.: 13/003,662

(22) PCT Filed: Aug. 5, 2009

(86) PCT No.: PCT/JP2009/063872
§ 371 (c)(1),
(2), (4) Date: Jan. 11, 2011

(87) PCT Pub. No.: WO2010/016519
PCT Pub. Date: Feb. 11, 2010

(65) Prior Publication Data
US 2011/0109270 A1    May 12, 2011

(30) Foreign Application Priority Data
Aug. 6, 2008  (JP) ................................. 2008-203270

(51) Int. Cl.
| H02J 7/00 | (2006.01) |
| H01M 10/44 | (2006.01) |
| H01M 10/48 | (2006.01) |
| H01M 10/42 | (2006.01) |

(52) U.S. Cl.
CPC ........... H02J 7/0016 (2013.01); H01M 10/441 (2013.01); H01M 10/482 (2013.01); H01M 2010/4271 (2013.01)
USPC .......................................... 320/118; 320/116

(58) Field of Classification Search
USPC ....................................................... 320/118
See application file for complete search history.

(56) References Cited

U.S. PATENT DOCUMENTS

| 4,079,303 | A | * | 3/1978 | Cox ............................. 320/119 |
| 5,063,340 | A | * | 11/1991 | Kalenowsky ................. 320/166 |
| 5,313,152 | A | * | 5/1994 | Wozniak et al. ............. 320/118 |
| 6,150,795 | A | * | 11/2000 | Kutkut et al. ................. 320/118 |
| 6,297,618 | B2 | * | 10/2001 | Emori et al. ................. 320/132 |
| 6,417,646 | B1 | * | 7/2002 | Huykman et al. ............ 320/122 |
| 2008/0018300 | A1 | * | 1/2008 | Zaag et al. .................... 320/118 |

FOREIGN PATENT DOCUMENTS

| JP | 63-314132 | 12/1988 |
| JP | 10-257682 | 9/1998 |
| JP | 10-295081 | 11/1998 |
| JP | 2003-189480 | 7/2003 |
| JP | 2006-067742 | 3/2006 |
| JP | 2007-300701 | 11/2007 |

* cited by examiner

Primary Examiner — Drew A Dunn
Assistant Examiner — Robert Grant
(74) Attorney, Agent, or Firm — Harness, Dickey & Pierce, P.L.C.

(57) ABSTRACT

Provided is an inter-module voltage balance correcting circuit of a power storage system including a plurality of storage modules connected in series, each of the storage modules including a plurality of storage cells connected in series. The inter-module voltage balance correcting circuit includes a resistance voltage dividing circuit (R1-R2) that equally divides a series voltage across a first storage module and a second storage module connected in series; and a pair of transistors that are turned ON/OFF complementarily based on a voltage (Vp1-Vp2) appearing between an intermediate connecting point (p2) between the storage modules M1, M2 in series and a voltage dividing point p1 of the resistance voltage dividing circuit, and a bypass discharge resistive element is selectively connected to modules by turning ON/OFF the complementary transistors.

6 Claims, 5 Drawing Sheets

INTER-MODULE VOLTAGE BALANCE CORRECTING CIRCUIT OF A POWER STORAGE SYSTEM

CROSS-REFERENCE TO RELATED APPLICATIONS

This application is a 371 U.S. National Stage of International Application No. PCT/JP2009/063872, filed Aug. 5, 2009, Year. This application claims the benefit of Japanese Patent Application No. 2008-203270, filed Aug. 6, 2008. The disclosures of the above applications are incorporated herein by reference.

TECHNICAL FIELD

The present invention relates to an inter-module voltage balance correcting circuit of a power storage system, and particularly relates to a technique that is effective when using a plurality of storage cells, such as secondary batteries and capacitors, in a series-connected manner.

BACKGROUND ART

Storage cells such as secondary batteries and capacitors are used in power storage systems such as instantaneous voltage drop/instantaneous power failure compensation apparatuses and power storage apparatuses for railroad use. In such power storage systems, since an available voltage of a single storage cell is only several volts, a plurality of storage cells are used in a series-connected manner.

In such a case, it is more efficient to prepare a plurality of storage modules each including a certain number of storage cells connected in series and obtain a target usage voltage by connecting a required number of storage modules in series. With the storage cells being modularized into modules each including a certain number of series-connected storage cells, it becomes possible to standardize the modules and to reduce cost by mass production and thus users can easily and freely create power storage systems of desired voltages using the standardized modules.

In case voltage variation occurs between cells in series-connected cells in which a plurality of storage cells are connected in series, there arises a problem that the voltage concentrates on a specific cell and the duration of the cell will be shortened. Such a problem due to voltage variation between the cells becomes more significant as the number of cells in the series connection increases.

Therefore, use of storage cells in a series connection requires a balance correcting circuit that compensates for voltage variation between the cells. Various techniques have been suggested for balance correcting circuits that compensate for voltage variation between the cells (E.g., see Patent Literatures 1 and 2).

CITATION LIST

Patent Literature

Patent Literature 1: JP-A-2003-189480
Patent Literature 2: JP-A-2006-67742

SUMMARY OF INVENTION

Technical Problem

As has been described above, for power storage systems including a plurality of storage cells is connected in series, various balance correcting circuits have been proposed to compensate for voltage variation between the cells. However, in a case where the storage cells are used in a modularized manner, maintenance such as cell replacement is carried out module-by-module and, therefore, it is preferable for voltage variation to be compensated between the modules rather than between the cells. In other words, there is a need for an inter-module voltage balance correcting circuit.

However, there was no such circuit that can readily, as well as, simply and at a low cost, compensate for voltage variation between modules and particularly for voltage variation between modules that may gradually arise during a prolonged charging duration.

The present invention has been made in view of such a problem and its object is to provide, in a power storage system such as an instantaneous voltage drop/instantaneous power failure compensation apparatus and a power storage apparatus for railroad use, an inter-module voltage balance correcting circuit of the power storage system that can readily, as well as, simply and at a low cost, compensate for voltage variation between modules that may gradually arise during a prolonged charging duration, by means of a circuit that is readily adjustable to an increase/decrease of the number of storage modules connected in series.

Objects and structures of the invention other than those described above will be elucidated in the description in the specification and from accompanying drawings.

Solution to Problem

The present invention provides means for solving the problems as described below.
(1) An inter-module voltage balance correcting circuit of a power storage system including a plurality of storage modules connected in series, each of the storage modules including a plurality of storage cells connected in series, the inter-module voltage balance correcting circuit including:
  a resistance voltage dividing circuit that equally divides a series voltage across a first storage module and a second storage module connected in series; and
  a pair of transistors that are turned ON/OFF in a complementary manner based on a voltage that appears between an intermediate connecting point between the first and second storage modules and a voltage dividing point of the resistance voltage dividing circuit,
  one of the pair of transistors being turned ON in a case where a dividing voltage that appears at the voltage dividing point becomes higher than an intermediate voltage that appears at the intermediate connecting point and causing a bypass discharge resistive element to be connected to a storage module situated at a positive side of the 2-series-connected modules,
  the other of the pair of transistors being turned ON in a case where the dividing voltage becomes lower than the intermediate voltage and causing a bypass discharge resistive element to be connected to a storage module situated at a negative side of the 2-series-connected modules.
(2) The inter-module voltage balance correcting circuit according the above-mentioned means (1),
  wherein, in a case where three or more storage modules are connected in series, a correction circuit unit including the resistance voltage dividing circuit and the transistors is provided for every two storage modules situated next to each other in an order of connection in the series.
(3) The inter-module voltage balance correcting circuit according to the above-mentioned means (2), further including an electric current passage correction resistive element that equalizes a current passage condition of an electric current flowing through the resistance voltage dividing circuit of each of the correction circuit unit.

(4) The inter-module voltage balance correcting circuit according to any of the above-mentioned means (1) to (3), wherein each of the pair of transistors is provided with a transistor added thereto that forms a multi-stage direct-coupled amplification circuit.

(5) The inter-module voltage balance correcting circuit according to the above-mentioned means (4), wherein the added transistor is a Darlington-connected bipolar transistor.

(6) The inter-module voltage balance correcting circuit according to any of the above-mentioned means (1) to (5), wherein each of the storage module is provided with an overdischarge protection circuit that monitors voltages of the plurality of storage cells connected in series individually and, in a case there is a cell having a high voltage, connects the cell to a bypass discharge resistive element, and wherein, by being turned ON, the pair of transistors causes all of the bypass discharge resistive elements in the protection circuit to be connected at once to the cells in the modules.

Advantageous Effects of the Invention

According to an aspect of the invention, for example, in a power storage system such as an instantaneous voltage drop/instantaneous power failure compensation apparatus and a power storage apparatus for railroad use, voltage variation between modules that may gradually arise during a prolonged charging duration can be readily, as well as, simply and at a low cost, compensated by means of a circuit that is readily adjustable to an increase/decrease of the number of storage modules connected in series.

Other effects of the aspect of the invention will be elucidated from the following description and accompanying drawings.

MODE FOR CARRYING OUT THE INVENTION

Figure 1:
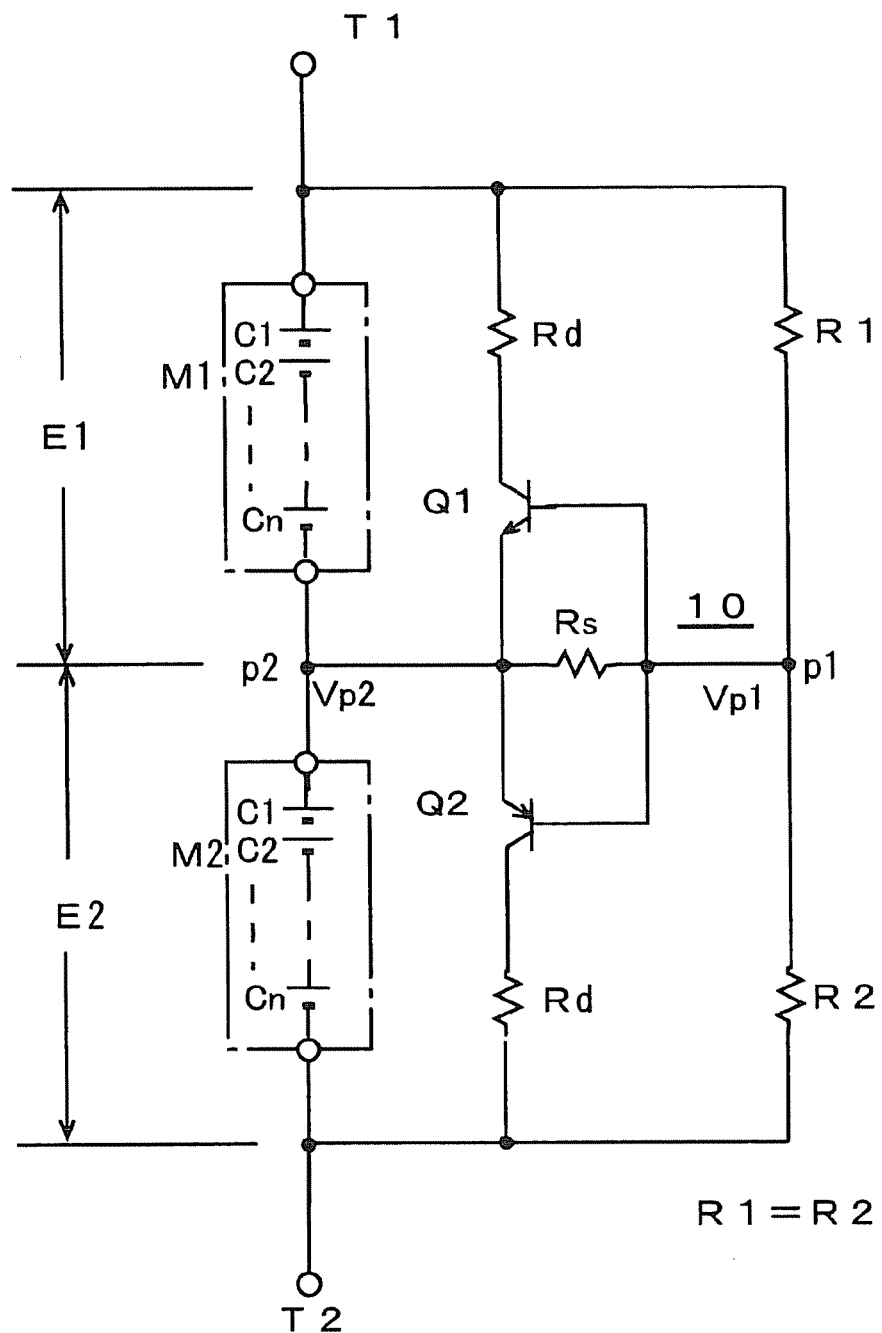
FIG. 1 is a circuit diagram illustrating a first embodiment of an inter-module voltage balance correcting circuit of a power storage system of the present invention.

FIG. 1 illustrates a first embodiment of an inter-module voltage balance correcting circuit of a power storage system of the present invention. A circuit 10 shown in FIG. 1 is an inter-module voltage balance correcting circuit of a power storage system including a plurality of storage modules M1, M2 connected in series in which each storage module includes a plurality of storage cells C1, C2, ..., Cn connected in series, and includes a resistance voltage dividing circuit (R1-R2) and a pair of transistors Q1, Q2.

The resistance voltage dividing circuit (R1-R2) includes resistive elements R1, R2 of the same value (R1=R2) and equally divides a series voltage (E1+E2) across a first storage module M1 and a second storage module M2 connected in series.

The pair of transistors Q1, Q2 are npn and pnp complementary bipolar transistors that are turned ON/OFF in a complementary manner based on a voltage (Vp1-Vp2) that appears between an intermediate connection point p2 between the first storage module M1 and the second storage module M2 and a voltage dividing point p1 of the resistance voltage dividing circuit (R1-R2).

The npn bipolar transistor Q1 of the pair of transistors Q1, Q2 has a base connected to the voltage dividing point p1, an emitter connected to the intermediate connecting point p2 and a collector connected, via a resistive element Rd, to a positive terminal (T1) of the 2-series-connected modules.

The pnp bipolar transistor Q2 has a base connected to the voltage dividing point p1, an emitter connected to the intermediate connecting point p2 and a collector connected, via a resistive element Rd, to a negative terminal (T2) of the 2-series-connected modules.

The bases and the emitters, respectively, of the transistors Q1 and Q2 are commonly connected, and a common input resistive element Rs is connected between the common bases and common emitters. The input resistive element Rs is for providing a predetermined input impedance between the bases and the emitters of the transistors Q1 and Q2, but can be theoretically dispensed with (a resistance being infinitely large). However, in practice, in order for electric charges accumulated at the base to flow out, it is better to connect a resistive element Rs having a finite resistance.

The bypass discharge resistance element Rd forms a bypass discharge path for the module N1, in a case where the transistor Q1, Q2 is turned ON.

That is to say, in a case where a dividing voltage Vp1 appearing at the voltage dividing point p1 becomes higher than an intermediate voltage Vp2 appearing at the intermediate connecting point p2, the transistor Q1 is turned ON and the bypass discharge path for the module M1 is formed by the bypass discharge resistance element Rd. Thus, in a case where voltage E1 of the module M1 becomes higher than voltage E2 of the module M2 by a certain amount, a discharge current to equalize this will flow.

In a case where the dividing voltage Vp1 becomes lower than the intermediate voltage Vp2, the transistor Q2 is turned ON and the bypass discharge path for the module M2 is formed by the bypass discharge resistance element Rd. Thus, in a case where voltage E2 of the module M2 becomes higher than voltage E1 of the module M1 by a certain amount, a discharge current to equalize this will flow.

Accordingly, in a power storage system such as, for example, an instantaneous voltage drop/instantaneous power failure compensation apparatus and a power storage apparatus for railroad use, a voltage variation between modules that may gradually arise during a prolonged charging duration can be readily, as well as, simply and at a low cost, compensated by means of a circuit that is readily adjustable to an increase/decrease of the number of storage modules connected in series.

The above-described correction circuit 10 is, as illustrated in the drawings, a very simple circuit that can be configured with single transistors Q1, Q2 and the resistive elements R1, R2, Rd and Rd, and such configuration is particularly effective in increasing liability. Therefore, it is particularly preferable for a power storage system that is used for a prolonged period without maintenance.

Figure 2:
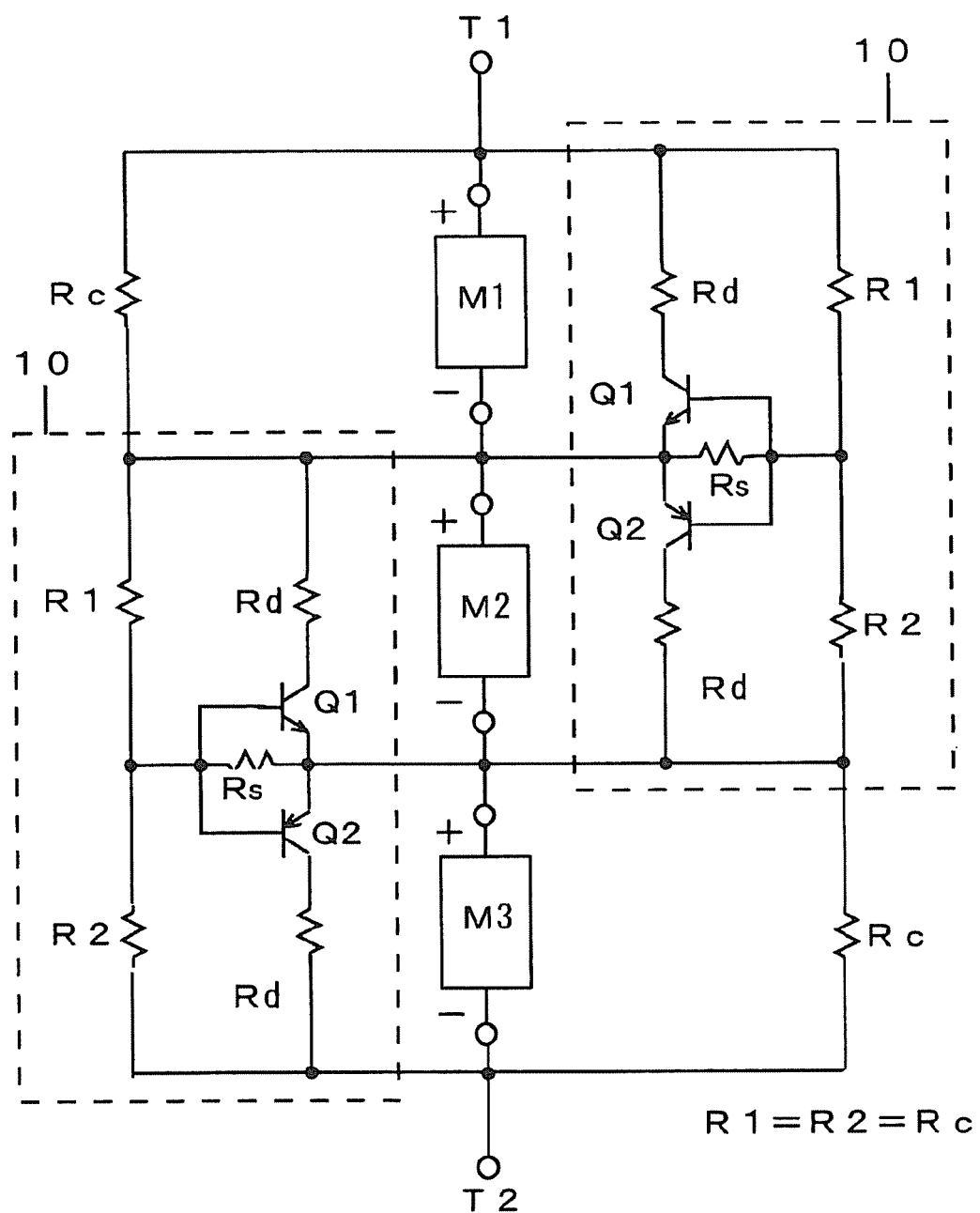
FIG. 2 is a circuit diagram illustrating an exemplary configuration in a case where three or more storage modules are connected in series.

Also, the above-mentioned correction circuit 10 can be, as shown in FIG. 2, configured as a circuit unit including the resistance voltage dividing circuit (R1-R2) and the single transistors Q1 and Q2.

For example, as shown in FIG. 2, in a case where three or more storage modules M1-M3 are connected in series, the correction circuit 10 configured as a unit may be provided for every two storage modules situated next to each other in an order of connection in the series (M1 and M2), (M2 and M3). Thus, it is possible to easily adjust to increase/decrease in the number of storage modules connected in series.

In such a case, as shown in FIG. 2, in order to equalize conduction condition of a current flowing through the resistance voltage dividing circuit (R1-R2) in each correction circuit 10, it is preferable to provide a conduction correction resistive element Rc. This conduction correction resistive element Rc has the same value (R1=R2=Rc) as the resistive elements (R1, R2) of the resistance voltage dividing circuit (R1-R2), and with a series voltage across all modules M1-M3 being directly applied to both ends of a series-connected resistive circuit (R1-R2-Rc), the conduction condition of the current flowing through each resistance voltage dividing circuit (R1-R2) can be equalized and a voltage dividing operation can be stabilized and made more accurate.

Figure 3:
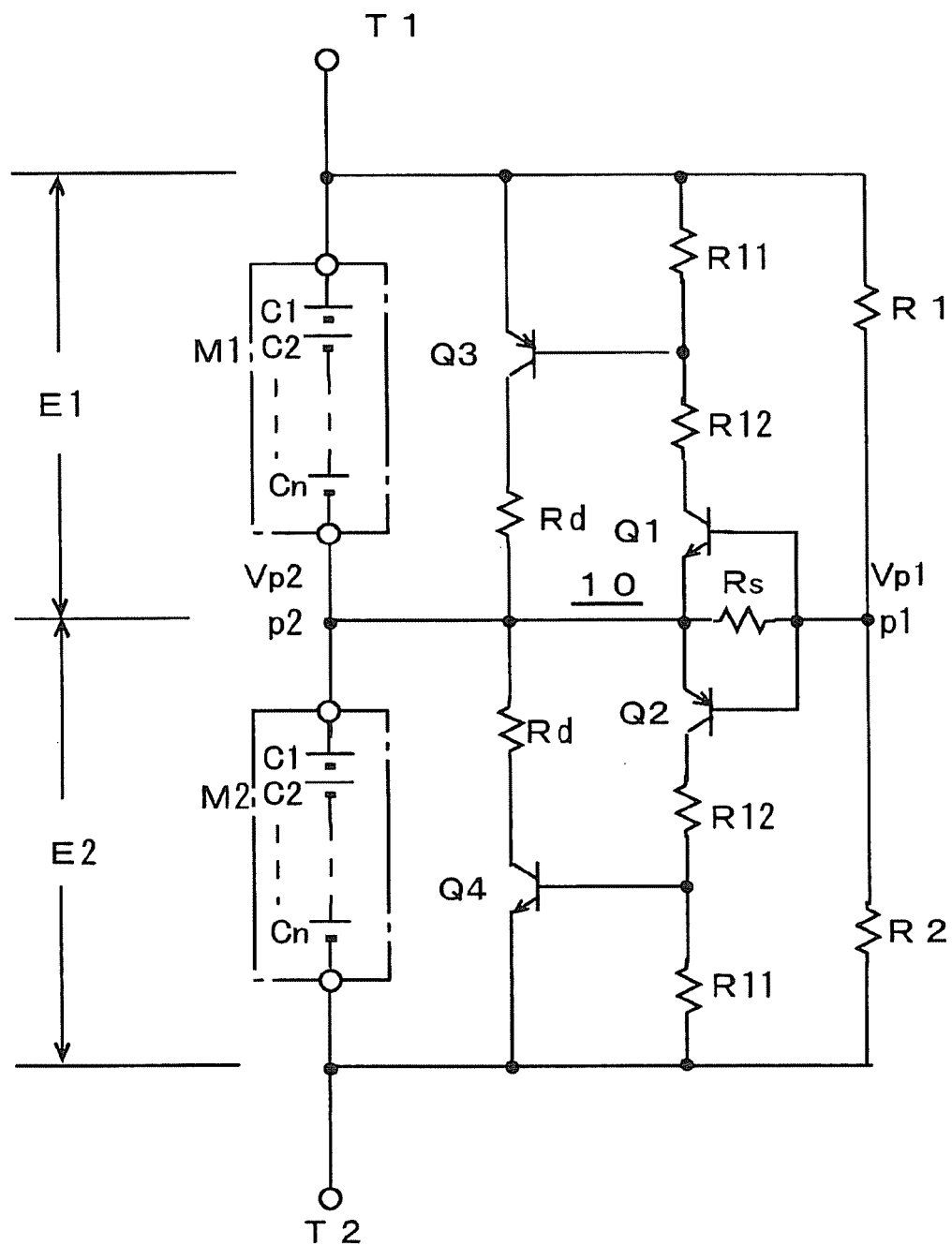
FIG. 3 is a circuit diagram illustrating a second embodiment of the inter-module voltage balance correcting circuit of the power storage system of the present invention.

FIG. 3 is a circuit diagram illustrating a second embodiment of the inter-module voltage balance correcting circuit of the power storage system of the present invention. In a circuit 10 shown in FIG. 3, the pair of transistors Q1, Q2 turned ON/OFF based on a difference (Vp1-Vp2) between the dividing voltage Vp1 and the intermediate voltage Vp2 are provided with transistor Q3, Q4, respectively, to form a multi-stage direct connection amplifier circuit.

In other words, collectors of the transistors Q1, Q2 are connected to terminals (T1, T2) of the series of modules M1, M2 via two series-connected load resistive elements R11 and R12, respective. Thus, Q1 and Q2 form common emitter amplifier circuits, respectively, and their amplified outputs are obtained at intermediate connecting points between the load resistive elements R11 and R12, respectively and are inputted to the bases of the transistors Q3, Q4, respectively.

The transistors Q3, Q4 have emitters connected to the terminals (T1, T2) of the series of the modules M1, M2, respectively, and collectors connected to the intermediate connecting point p2 via the bypass discharge resistance elements Rd, respectively.

In this manner, by forming the multi-stage direct connection amplifier circuit, the current obtained from the resistance voltage dividing circuit (R1-R2) can be made very small. Thus, by setting the resistance of the resistance voltage dividing circuit (R1-R2) at a very high value, the current that is constantly flowing through the resistance voltage dividing circuit (R1-R2) can be made so small that it is almost negligible.

As a result, for example, even if an inventory period/retaining period from shipping until usage of the storage module is prolonged, overdischarging of the storage cells (C1, C2, ..., Cn) in the modules M1, M2 during such inventory period can be avoided. Therefore, time management from shipping to usage can be substantially dispensed with.

Figure 4:
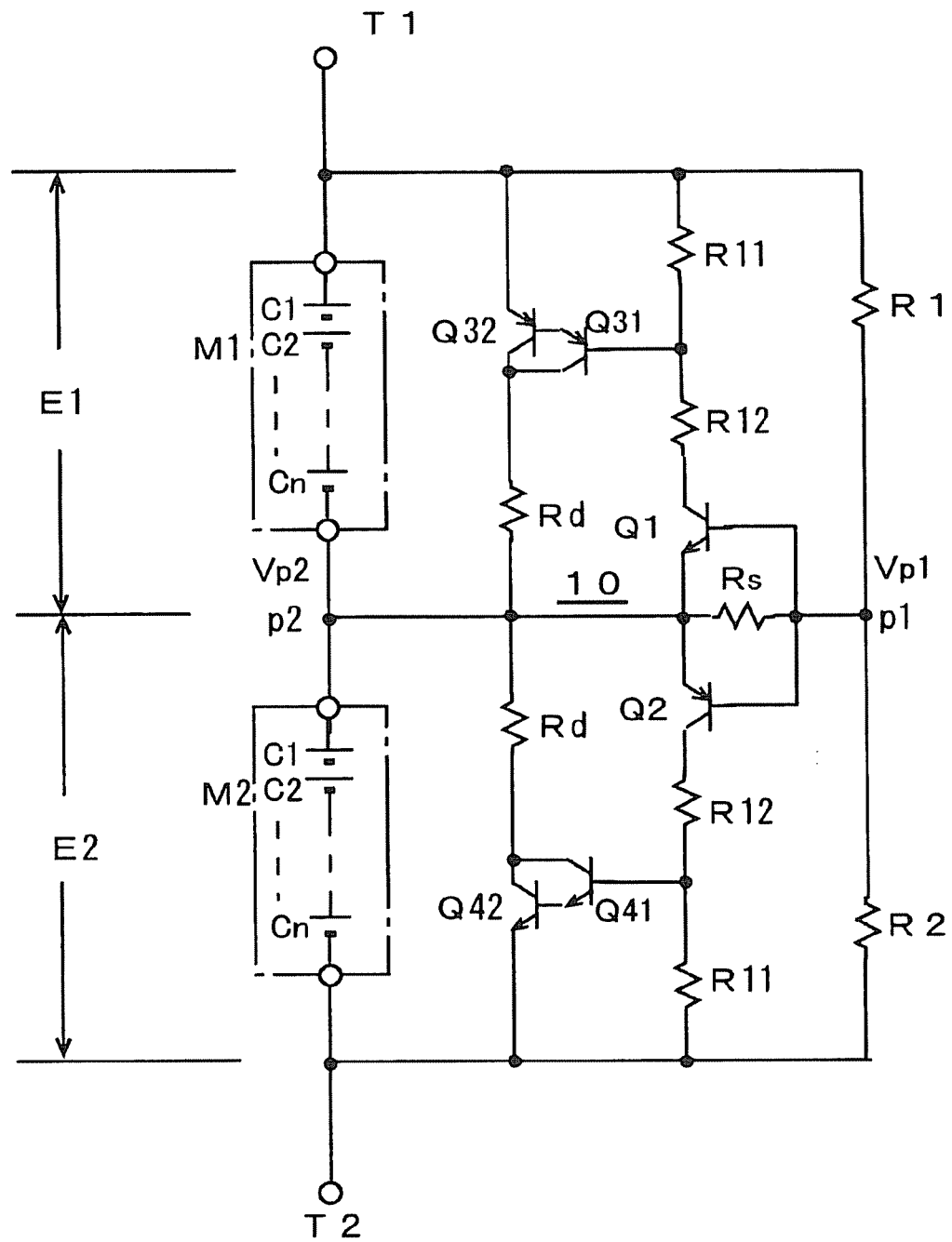
FIG. 4 is a circuit diagram illustrating a third embodiment of the inter-module voltage balance correcting circuit of the power storage system of the present invention.

FIG. 4 is a circuit diagram illustrating a third embodiment of the inter-module voltage balance correcting circuit of the power storage system of the present invention. Focusing on the difference with respect to the embodiment shown in FIG. 3, this embodiment utilizes Darlington-connected bipolar transistors (Q31-Q32), (Q41-Q42) as the additional transistors forming the multi-stage direct connection amplifier circuit.

Accordingly, the resistance of the resistance voltage dividing circuit (R1-R2) can be further increased and the constantly flowing current can be made extremely small. Thus, time management from shipping to usage can be positively dispensed with.

Also, with such an embodiment, since an apparent base-emitter voltage of the Darlington-connected bipolar transistors (Q31-Q32) becomes higher, unnecessary compensation can be avoided for a small voltage variation that does not require correction.

Figure 5:
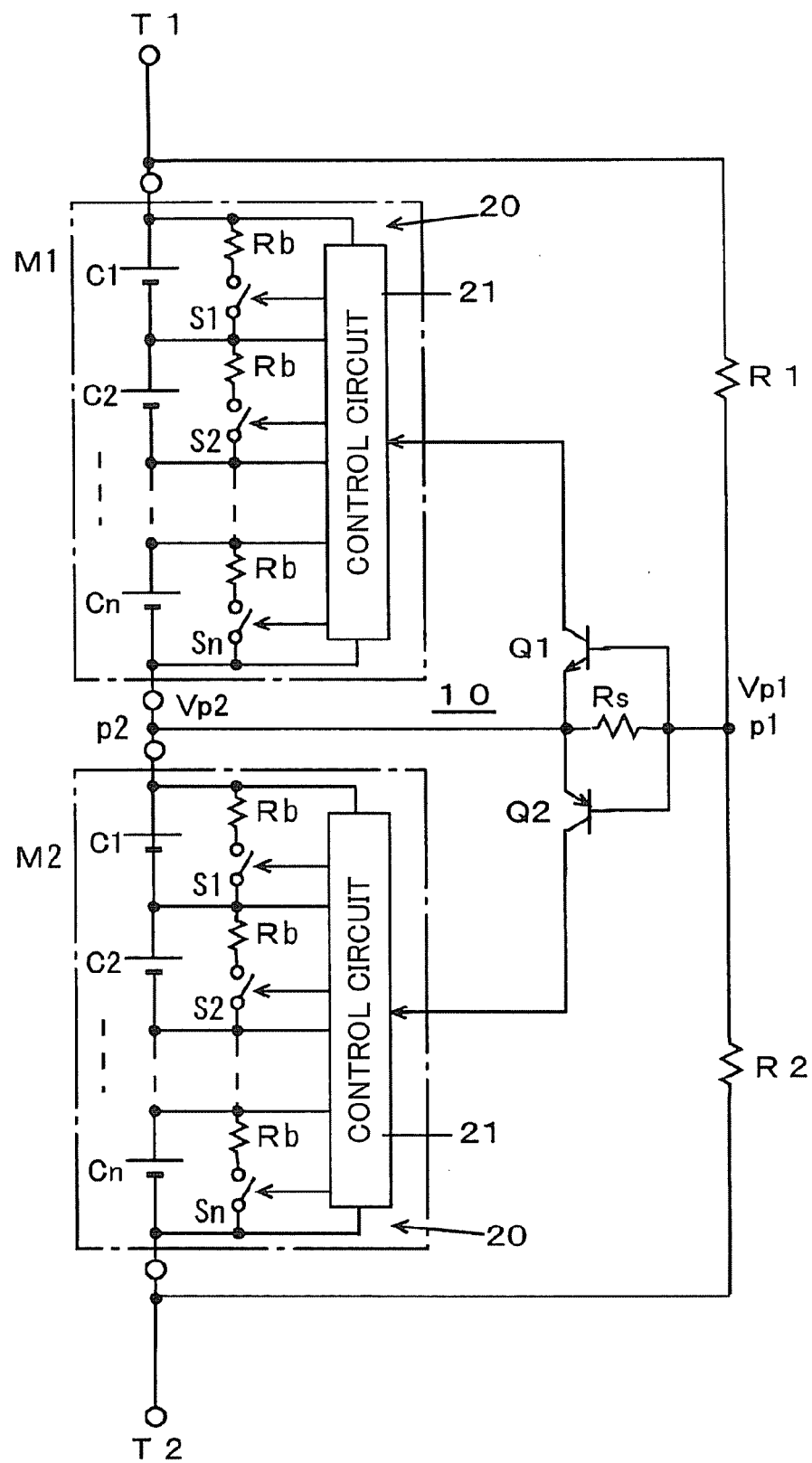
FIG. 5 is a circuit diagram illustrating a fourth embodiment of the inter-module voltage balance correcting circuit of the power storage system of the present invention.

FIG. 5 is a circuit diagram illustrating a fourth embodiment of the inter-module voltage balance correcting circuit of the power storage system of the present invention. As shown in FIG. 5, storage cells (C1, C2, ..., Cn) in each of the modules M1, M2 can be protected by using a conventional overcharge connecting circuit 20 as disclosed in Patent Literature 1.

Such protection circuit 20 includes a control circuit 21, bypass discharge resistance elements (Rb, Rb, ..., Rb) and semiconductor switches (S1, S2, ..., Sn). The bypass discharge resistance elements (Rb, Rb, ..., Rb) are connected to the storage cells (C1, C2, ..., Cn) via the semiconductor switches (S1, S2, ..., Sn), respectively.

The control circuit 21 monitors voltages of the storage cells (C1, C2, ..., Cn), individually, and, in a case where there is a cell with a high voltage, the switch (S1, S2, ..., Sn) corresponding to the cell is turned ON and such cell is discharged by being connected to the bypass discharge resistance element Rb.

Here, the pair of transistors Q1, Q2 are operated in such a manner that, in a case where they are turned ON based on the difference (Vp1-Vp2) between the dividing voltage Vp1 and the intermediate voltage Vp2, in this ON state, all bypass discharge resistance elements Rb in the protection circuit 20 are connected at once to the cells (C1, C2, ..., Cn) in the modules M1, M2. That is to say, Q1 and Q2 causes the cells (C1, C2, ..., Cn) in the modules M1, M2 to discharge at once by interrupting the operation of the control circuit 21.

Accordingly, in a case where the overdischarge protection circuit 20 is provided in the modules M1, M2, this can be used to perform voltage balance correction between the modules M1 and M2.

In the above description, although the present invention has been explained based on its representative embodiments, the present invention can be embodied as various other embodiments other than those disclosed above. For example, the above-mentioned transistor can be replaced with a MOS transistor.

INDUSTRIAL APPLICABILITY

For example, in a power storage system such as an instantaneous voltage drop/instantaneous power failure compensation apparatus and a power storage apparatus for railroad use, voltage variation between modules that may gradually arise during a prolonged charging duration can be readily, as well as, simply and at a low cost, compensated by means of a circuit that is readily adjustable to increase/decrease of the number of storage modules connected in series.

REFERENCE SIGNS LIST 10 correction circuit (unit),
C1, C2, ..., Cn storage cells,
M1, M2, M3 storage modules, R1, R2 resistive element forming resistance voltage dividing circuits (R1-R2),
Rc conduction correction resistive element (R1=R2=R3),
Q1, Q2 a pair of transistors (complementary transistors),
p1 voltage dividing point of resistance voltage dividing circuit (R1-R2),
p2 intermediate connecting point of storage module,
Vp1 dividing voltage,
Vp2 intermediate voltage,
Rd bypass discharge resistive element,
Q3, Q4 transistors,
Q31, Q32, Q41, Q42 transistors,
R11, R12 load resistive elements,
20 overdischarge protection circuit,
21 control circuit,
Rb, Rb, . . . , Rb bypass discharge resistive elements,
S1, S2, . . . , Sn semiconductor switches

The invention claimed is:

1. An inter-module voltage balance correcting circuit of a power storage system including a plurality of storage modules connected in series, each of the storage modules including a plurality of storage cells connected in series, the inter-module voltage balance correcting circuit comprising:
   a resistance voltage dividing circuit that equally divides a series voltage across a first storage module and a second storage module connected in series;
   a pair of transistors that are turned ON/OFF in a complementary manner based on a voltage that appears between an intermediate connecting point between the first and second storage modules and a voltage dividing point of the resistance voltage dividing circuit, the pair of transistors having commonly connected bases and commonly connected emitters; and
   a resistive element whose one end is connected to the commonly connected bases and whose other end is connected to the commonly connected emitters, the one end of the resistive element being further connected to the voltage dividing point, the other end of the resistive element being further connected to the intermediate connecting point,
   one of the pair of transistors being turned ON in a case where a dividing voltage that appears at the voltage dividing point becomes higher than an intermediate voltage that appears at the intermediate connecting point and causing a bypass discharge resistive element to be connected to a storage module situated at a positive side of the series-connected storage modules,
   the other of the pair of transistors being turned ON in a case where the dividing voltage becomes lower than the intermediate voltage and causing a bypass discharge resistive element to be connected to a storage module situated at a negative side of the series-connected storage modules.

2. The inter-module voltage balance correcting circuit according to claim 1,
   wherein, in a case where three or more storage modules are connected in series, a correction circuit unit including the resistance voltage dividing circuit and the transistors is provided for every two storage modules situated next to each other in an order of connection in the series.

3. The inter-module voltage balance correcting circuit according to claim 2,
   further comprising an electric current passage correction resistive element that equalizes a current passage condition of an electric current flowing through the resistance voltage dividing circuit of each of the correction circuit units.

4. The inter-module voltage balance correcting circuit according to claim 1,
   wherein each of the pair of transistors is provided with a transistor added thereto that forms a multi-stage direct-coupled amplification circuit.

5. The inter-module voltage balance correcting circuit according to claim 4,
   wherein the added transistor is a Darlington-connected bipolar transistor.

6. The inter-module voltage balance correcting circuit according to claim 1,
   wherein each of the storage modules is provided with an overcharge protection circuit that monitors voltages of the plurality of storage cells connected in series individually and, in a case there is a cell having a high voltage, connects the cell to a bypass discharge resistive element, and
   wherein, by being turned ON, the pair of transistors causes all of the bypass discharge resistive elements in the protection circuit to be connected at once to the cells in the modules.

* * * * *